United States Patent [19]

Swiger et al.

[11] 4,147,740
[45] Apr. 3, 1979

[54] GRAFT MODIFIED POLYETHYLENE PROCESS AND PRODUCT

[75] Inventors: Roger T. Swiger, Schenectady; Peter C. Juliano, Scotia, both of N.Y.

[73] Assignee: General Electric Company, Schenectady, N.Y.

[21] Appl. No.: 723,618

[22] Filed: Sep. 15, 1976

[51] Int. Cl.$^2$ ............................................. C08F 255/02
[52] U.S. Cl. .................................................. 260/878 R
[58] Field of Search .................................... 260/878 R

[56] References Cited

U.S. PATENT DOCUMENTS

| | | | |
|---|---|---|---|
| 3,433,777 | 3/1969 | Brunson | 260/878 R |
| 3,862,265 | 1/1975 | Steinkamap et al. | 260/878 R |
| 3,873,643 | 3/1975 | Wu et al. | 260/878 R |
| 3,882,194 | 5/1975 | Krebaum et al. | 260/878 R |
| 3,928,497 | 12/1975 | Ohmori et al. | 260/878 R |

*Primary Examiner*—Alan Holler
*Attorney, Agent, or Firm*—F. Wesley Turner; Joseph T. Cohen; Charles T. Watts

[57] ABSTRACT

A graft modified polyethylene process is described which comprises contacting polyethylene with an organic peroxide in the presence of an ethylenically unsaturated polycarboxylic acid or derivative thereof at a temperature of from 140°–210° C. The resulting graft modified polyethylene in combination with polyamides provide polymer blends having improved impact properties.

16 Claims, No Drawings

GRAFT MODIFIED POLYETHYLENE PROCESS AND PRODUCT

CROSS REFERENCE

This invention is related to copending application of R. T. Swiger and L. A. Mango, III Ser. No. 687,925, filed May 19, 1976 which is assigned to the same assignee as the assignee of this application. The subject matter of the related copending application is incorporated herein by reference in its entirety.

BACKGROUND OF THE INVENTION

1. Field of the Invention

This invention relates to a graft modified polyethylene and a process comprising contacting polyethylene with a organic peroxide in the presence of an ethylenically unsaturated polycarboxylic acid or derivative thereof at a temperature of 140°–210° C.

2. Description of the Prior Art

Various observations have been made by the prior art regarding reactions between polyolefins with ethylenically unsaturated polycarboxylic acids using peroxy compounds as catalysts:

Fasce in U.S. Pat. No. 2,973,344, issued Feb. 28, 1961 which broadly describes the concept of contacting polyolefins with unsaturated $\alpha$-$\beta$ dicarboxylic acid anhydrides in the presence of a peroxide catalyst to produce modified polymers having substantially increased melting points and very low solubility in nonpolar solvents;

Wu et al. U.S. Pat. No. 3,873,643, issued Mar. 25, 1975, which describes a process for the preparation of graft copolymers of polyolefins and at least one monomer selected from the class of polymerizable cyclic or polycyclic ethylenically unsaturated acids or acid anhydrides prepared by grafting the monomer to the polyethylene in the presence of hydroperoxides or other free radical catalysts at a temperature above the melting point of polyolefin;

Japan publication Sho 45/1970-30943, dated Oct. 7, 1970, which describes modifications of polyolefin blends by addition to the two component blends of polyolefin contacted with an unsaturated carboxylic acid or a derivative thereof such as anhydride of a carboxylic acid and dibenzoyl peroxide in a fused state; and Japan publication Sho 50/1975-1198888, dated Sept. 19, 1975, which describes the process for modifying polyolefins by grafting maleic anhydrides onto the polyolefins in a molten state in the presence of a hydroperoxide.

Although the prior art focuses on graft modification of the polyolefins in the presence of peroxy compounds, heretofore prior art has not recognized an efficient graft modified polyethylene process wherein substantially all of the modifier processed with the polyethylene is grafted to the polymer backbone without deleteriously affecting the physical and chemical properties of the polyolefin.

DESCRIPTION OF THE INVENTION

This invention embodies a process comprising contacting a polyolefin with an ethylenically unsaturated polycarboxylic acid, anhydride or ester including mixtures thereof at a temperature of from 140°–210° C. in the presence of an organic peroxide including a hydroperoxide under melt conditions.

Any of the polyolefins and any of the ethylenically unsaturated polycarboxylic acid, anhydrides and esters described in the referenced copending patent application of Swiger and Mango referenced hereinbefore can be employed in this invention.

The definitions of polyolefins, polyethylene, ethylenically unsaturated polycarboxylic acid or anhydride or esters, i.e. "modifiers" as defined in the copending Swiger and Mango referenced hereinbefore patent application are defined herein in the appended claims in accordance with the Swiger and Mango disclosure.

In the practice of this invention, preferred ethylene polymers may contain up to 40% by weight of other olefins such as propylene, 1-butene, 1-hexene, i.e. acyclic-1-monoolefins having from 3 to 8 carbon atoms per molecule and mixtures thereof.

Preferred modifiers comprise maleic anhydride compounds of the formula

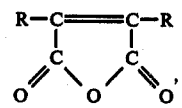

wherein R is hydrogen, a halogen or a lower alkyl group containing from 1 to 12 carbon atoms. Specific examples include maleic anhydride, monochloromaleic anhydride, dichloromaleic anhydride, citraconic anhydride, dimethylmaleic anhydride, etc. Of these maleic anhydride is the most presently preferred for economic reasons, e.g. ready availability and low material cost.

Any organic peroxide including a hydroperoxide having at least a 60 second half life at a temperature from 140°–210° C. can be employed. Some organic peroxides have the formula,

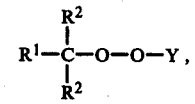

where Y is selected from hydrogen and

and $R^1$ and $R^2$ are selected from monovalent hydrocarbon radicals. Preferably, $R^1$ and $R^2$ contain from 1–30, more preferably 1–20 and even more preferably 1–10 carbon atoms. Illustrative of specific peroxides are dicumyl peroxide, 2,5-dimethyl-2,5di(t-butylperoxy)hexane, 2,5-dimethyl-2,5-di(t-butylperoxy)hexyne-3, di-t-butyl peroxide, etc.

The amount of modifier employed in any amount sufficient to produce a modified polyolefin wherein substantially all of the modifier is incorporated into the polyolefin matrix, e.g. wherein substantially 90% or more of the modifier contacting the polyethylene is grafted onto the polymer backbone.

In the practice of the invention from about $0.01 \times 10^{-4}$ to about $1 \times 10^{-1}$, preferably from about $5 \times 10^{-4}$ to about $2.5 \times 10^{-2}$ and more preferably from about $1 \times 10^{-3}$ to about $1.5 \times 10^{-2}$ molecular equivalents of active

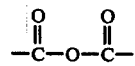

sites per 100 grams of polyethylene are prepared. For purposes of illustration, a presently preferred process embodies contacting an unmodified polyethylene, e.g. a low density polyethylene, with a modifier, e.g. maleic anhydride, in an amount of from about 0.01 to 10, preferably 0.05 to 2.5 and more preferably 0.1 to 1.50 percent by weight based on the weight of polyolefin for a period of time sufficient to incorporate substantially all of maleic anhydride into the polyolefin matrix at a temperature within the range of from 140° to 210°, preferably 160°–180° C.

In general, the reaction time required for modification of the polyolefin substrate is relatively short being in the order of magnitude of a few seconds to about 20 minutes, although extended heating times doe not substantially affect modification of the polyolefn and may be employed if desired. The process can be carried out in the absence or presence of air or in an inert atmosphere and preferentially is carried out under high shear mixing conditions such as those obtained by the use of extruders, internal Banbury mixers, roll mills, etc. A presently preferred high shear mixer comprises twin screw extruders, e.g. ZDS-K28 type Werner and Pfleiderer 28 mm. twin screw extruder, adapted to mechanically work and compound thermoplastic materials at elevated temperatures, containing vacuum or vent ports whereby any unreacted and entrained materials can be readily removed as materials are processed. In general, the process contact time can be any time period wherein a homogeneous dispersion is formed, e.g. time period as low as 1 sec. up to 10 hours or even higher.

By the practice of the process of this invention, graft modified polyolefins are obtained which have substantially the same physical characteristics as that of the unmodified polyolefins, particularly tensile strength and ultimate elongation. In addition, the graft modified polyolefin has substantially the same viscosity, plasticity and thermodynamic characteristics of the unmodified polyethylene as determined by thermodynamic Tm melting point. Accordingly, the modified polyolefins obtained by the practice of this invention substantially exhibit the same melt flow characteristics, melting point and the viscosity as the corresponding characteristics associated with the polymer prior to graft modification. The advantages obtained by the practice of this invention will be obvious to those skilled in the art in that the polyolefins can be modified by the incorporation therein of

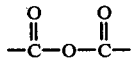

groups at elevated temperature without modification of the mechanical characteristics of polyolefins under process reaction conditions wherein the polyolefin is essentially not crosslinked or deleteriously affected as a result of the presence of peroxy compounds.

The term "polyethylene" as used herein and in the appended claims includes ethylene homopolymers and copolymers of ethylene and propylene, butenes or other unsaturated aliphatic hydrocarbons.

The preferred copolymers of ethylene contain up to forty percent (40%) by weight of higher olefins such as propylene, 1-butene, 1-hexene, i.e. acyclic 1-mono-olefins having from 3 to 8 carbon atoms per molecule and mixtures thereof. Additionally, but less preferably, the copolymers contain up to five percent (5%) of such di- or triolefins as are commercially employed in ethylene propylene terpolymers such as ethylidene norbornene, methylene norbornene, 1,4-hexadiene and vinylnorbornene. Additionally, the term polyethylene includes blends of homo-, co- or terpolyethylenes which include blends of two or more or the aforesaid polymer types. Any polyethylene subject to the proviso that the polyethylene have a density of at least about 0.85, preferably 0.915 to 0.970 or higher, prepared by any method well-known to those skilled in the art, including those described in Encyclopedia of Polymer Science and Technology, Vol. 6, entitled *Ethylene Polymers*, pages 275–454, Interscience Publishers (1969), which disclosures are incorporated herein in their entirety by reference, can be employed in the practice of this invention. Ethylene polymers prepared by low pressure or high pressure techniques which are commonly employed in the preparation of linear or high density polyethylene and branched or low density polyethylenes, respectively, well-known to those skilled in the art can be employed in the practice of this invention. The term "modified polyethylene" includes any polyethylene having an active

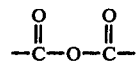

moiety integrated into or onto the ethylene polymer via graft or copolymerization techniques.

The modification of the polyethylene can be effected by grafting onto/or polymerizing into the polyethylene backbone any ethyleneically unsaturated polycarboxylic acid or anhydride, i.e. "modifier", which has ethylenic unsaturation. Presently preferred modifiers are derivatives of unsaturated cyclic polycarboxylic anhydrides, ethylenically unsaturated polycarboxylic acids which form anhydrides at elevated temperatures as well as esters of the polycarboxylic acids. Illustrative of polycarboxylic anhydrides, acids and esters among others that are suitable polyethylene modifiers, are the following: maleic acid, itaconic acid, citraconic acid, mesaconic acid, maleic anhydride, citraconic anhydride, itaconic anhydride, 4-methyl cyclohex-4-ene 1,2-dicarboxylic acid anhydride, bicyclo[2.2.2]oct-5-ene-2,3-dicarboxylic acid anhydride, 1,2,3,4,5,8,9,10-octahydronaphthalene-2,2-dicarboxylic acid anhydride, 2-oxa-1,3-diketospiro[4,4]non-7-ene, bicyclo[2.2.1]hept-5-ene-2,3-dicarboxylic acid anhydride, or maleo-primaric acid, dimethyl maleate, dipropyl maleate, diisobutyl maleate, dicyclopentyl maleate, dihexyl maleate, dibenzyl maleate, p-chlorophenyl methyl maleate, phenylethyl maleate, etc. Particularly preferred modifiers comprise maleic anhydride compounds of the formula:

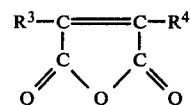

wherein $R^3$ is hydrogen, a halogen or a methyl group. Specific examples include maleic anhydride, monochloromaleic anhydride, dichloromaleic anhydride, citraconic anhydride, dimethylmaleic anhydride, etc. Of these maleic anhydride is the most presently preferred for economic reasons, e.g. ready availability and low material cost.

The modified polyethylene polymers can be prepared by any method which will produce on the polymer chain active

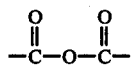

sites. Such active sites are readily introduced by procedures known to those skilled in the art as "graft Polymerization techniques". Illustrative of suitable techniques, among others, include heating the polyethylene to a temperature at or above the melting point of the polyethylene, preferably in the absence of an inert solvent, while subjecting the admixture in the presence of a modifier to the action of high energy ionizing radiations such as gamma rays, X-rays, or high speed electrons, or by contactng the polyethylene with a free radical producing material such as a peroxide or a hydroperoxide. Presently, modified polyethylene is preferably prepared by heating an admixture of polyethylene and a modifier above the melting point of the polyethylene in the presence of a free radical catalyst such as peroxides or hydroperoxides, preferably under high shear mixing conditions. Any of the commonly known peroxides which have the general formula $R^4-O-OH$ or $R^5OOR^5$, wherein $R^4$ and $R^5$ are organic radicals, and which have a half life of at least 2-60 seconds at 200° C. can be used. Illustrative of peroxides, among others, that can be used are dicumylperoxide, di-t-butyl hydroperoxide, p-methane hydroperoxide, and cumene hydroperoxide, etc. In general, in the absence of a solvent, the admixture is heated to a temperature above 100° C. and below 300° C. in order to provide sufficient heat and avoid substantial decomposition of the resulting modified polyethylene. Illustrative of presently preferred graft polymerization temperatures are temperatures within the range of from about 145°-260° C., more preferably from about 160°-210° C.

In general, the reaction time required for modification of the polyethylene substrate is relatively short, being of the order of magnitude of from a few seconds to about 20 minutes, although extended heating times do not substantially effect modification of the polyethylene and may be employed if desired.

The amount of modifier employed in the preparation of the modified polyethylene is any amount sufficient to produce a modified polyethylene which has incorporated in the polymer matrix from about $5 \times 10^{-4}$ to about $1 \times 10^{-1}$ preferably from about $1 \times 10^{-3}$ to about $5 \times 10^{-2}$ and more preferably from about $5 \times 10^{-3}$ to about $1.5 \times 10^{-2}$ molecular equivalents or mols of active

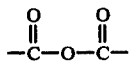

sites per 100 grams of polyethylene. For purposes of illustration, a presently preferred unmodified polyethylene, i.e. a low polyethylene, is contacted with a presently preferred modifier, i.e. maleic anhydride, in an amount of from about 0.1 to 1.25 percent by weight based on the weight of polyethylene under reaction conditions suited to chemical integration of the maleic anhydride into the polyethylene matrix via graft copolymerization techniques.

In order that those skilled in the art will be better able to practice the invention, the following examples are given by way of illustration and not by way of limitation. All parts are by weight.

EXAMPLE 1

Maleic anhydride modified polyethylene was made in accordance with the practice of the present invention by initially preheating 42 parts of low density polyethylene to a temperature of 110° C. The polyethylene was agitated for a period of about 5 minutes and a mixture of 0.53 part of maleic anhydride and 0.042 part of dicumyl peroxide was added to the polyethylene while it was stirred. After the mixture was agitated for two minutes, the temperature of the mixture was raised to 165° C. The resulting melt was then agitated for an additional 10 minutes and then the molten polyethylene was removed. Based on method of preparation, there was obtained maleic anhydride modified polyethylene having an average of from about 0.012 mols of chemically combined maleic anhydride units per 100 grams of polyethylene. The identity of the product was confirmed by its infrared spectrum and oxygen analysis.

The above procedure was repeated except that in place of the maleic anhydride there was used 0.63 part of maleic acid. It was found that after the same period of heating less than 1 percent by weight of the maleic acid had reacted. The temperature of the reaction mixture was then increased to 195° C. and di-t-butyl peroxide was used in place of the dicumyl peroxide. It was found that a significant increase in the reaction occurred and there was obtained a maleic acid modified polyethylene having an average of 0.0035 mols of maleic anhydride units per 100 grams of polyethylene incorporated into the polymer backbone. The identity of the product was confirmed by its infrared spectrum.

The same procedure was repeated except that in place of the maleic anhydride there was used 0.53 part of diethyl maleate. A significant reaction occurred and there was obtained a diethyl maleate modified polyethylene having an average of 0.003 mols of diethyl maleate units per 100 grams of polyethylene.

A mixture of 24.5 parts of Nylon 66 and 10.5 parts of the above maleic anhydride modified polyethylene was blended together at a temperature of 271° C. using a ZDS-K28 Werner and Pfleiderer 28 millimeter twin screw extruder operating at 200 RPM and extruded at a rate of 113 parts per minute. The extrudate was chopped into pellets and then dried and injection molded into test specimens of Nylon 66 free of polyethylene. In addition, test specimens were made from a Nylon-polyethylene blend free of maleic anhydride units having the same weight proportion of maleic anhydride modified polyethylene as previously described.

The above test specimens were then evaluated for Gardner impact at a temperature of 0° F. and 73° F. The specimens were also evaluated for Notched Izod impact value. It was found that the blend containing the maleic anhydride polyethylene exhibited superior Gardner impact at both 0° F. and 73° F., while the Nylon specimens and the specimens of the Nylon-polyethylene blend free of maleic anhydride units exhibited inferior Gardner impact at 0° F. In addition, the test specimens of the Nylon-polyethylene blend containing chemically combined maleic anhydride units exhibited a substantially superior Notched Izod impact value compared to the Notched Izod impact values of the Nylon and Nylon-polyethylene blend specimens free of chemically combined maleic anhydride units.

EXAMPLE 2

A maleic anhydride modified polyethylene was made following the procedure of Example 1 employing 0.021 part and 0.1 part of dicumyl peroxide respectively at a temperature of 165° C. In addition, there was used at a temperature of 133° C. in place of the dicumyl peroxide, 0.25 and 0.1 dibenzoyl peroxide. Complete incorporation of the maleic anhydride was achieved when using 0.1 part of the dicumyl peroxide, while only about 36 mol percent of the maleic anhydride was incorporated when using 0.021 part. On the other hand, it was found that only 3 mol percent and 22 mol percent of the maleic anhydride was incorporated using dibenzoyl peroxide. This result shows that the alkyl organic peroxides are more effective in the practice of the invention over the aromatic peroxides.

Bulk melt viscosities of a series of maleic anhydride modified polyethylenes were determined as a function of shear rate using a Instron capillary rheometer fitted with a 5000 pound maximum capacity load cell. Apparent melt viscosities at a fixed temperature of 525° F. were obtained over a range of shear rates including $86.7^{-1}$ seconds and $967^{-1}$ seconds. In addition to the aforementioned maleic anhydride modified polyethylene having 0.013 mols of maleic anhydride and 0.005 mols of maleic anhydride per 100 grams of polyethylene, respectively, there was also evaluated low density polyethylene, such as Cities Service EH 497, manufactured by the Citco Company of New York, New York. The results obtained are shown in Table I below, where the viscosity is expressed in poises and "PE" indicates unmodified polyethylene while "PEMA" indicates maleic anhydride modified polyethylene showing the mols of maleic anhydride units per 100 grams of polyethylene respectively.

TABLE I

| | $86.7 \text{ sec}^{-1}$ | $967 \text{ sec}^{-1}$ |
|---|---|---|
| PE, Cities Service EH 497 | 2600 | 950 |
| PEMA (.013 mols MA/100g PE) | 4800 | 1450 |
| PEMA (.005 mols MA/100g PE) | 4400 | 1450 |

The above results show that the viscosity of the modified polyethylene is significantly higher than the unmodified polyethylene under conditions of low shear, while the viscosity is substantially the same between modified and unmodified polyethylene under conditions of high shear. Those skilled in the art would know that the modified polyethylene could be readily processed, such as under injection molding conditions.

A series of maleic anhydride modified polyethylenes were prepared following the above procedure for the purpose of determining melting points employing a Differential Scanning Calorimeter. There was employed Cities Service XP80-8 low density polyethylene and Chemplex 6060 high density polyethylene as a base material. Modification of these base materials with maleic anhydride units was made in accordance with the above described procedure. It was found that the melt temperature of the unmodified low density polyethylene, 111° C. was substantially the same as the maleic anhydride counterpart having a range of about 0.005 mols of chemically combine maleic anhydride units (111° C.), and 0.013 mols of chemically combined maleic anhydride units (113° C.) and 0.025 mols of chemically combined maleic anhydride units (106° C.) per 100 grams of polyethylene, respectively. In addition, the high density polyethylene was found to have a melt index of 140° C., while the maleic anhydride modified counterpart, having 0.011 mols of chemically combined maleic anhydride units per 100 grams of polymer, had a melting temperature of 136° C.

It has been found that optimum results can be obtained with aliphatic, such as alkyl substituted peroxides, or hydroperoxides as previously defined as distinguished from aromatic peroxides, such as benzoyl peroxides. A proportion of from 0.01% to 0.3% by weight and preferably from 0.05% to 0.5% by weight of the alkyl peroxide, based on the weight of polyethylene can be employed.

Although the above examples are limited to only a few of the very many variables which can be used in the practice of the method of the present invention, it should be understood that there can be employed a much broader variety of organic peroxides, polyethylene modifiers, and varieties of polyethylene as shown in the description proceding these examples. In addition, a much broader variety of modified polyethylene is also provided which can be made by such method.

What we claim as new and desire to secure by Letters Patent of the United States is:

1. A process which comprises, mixing polyethylene with from 0.1 to 1.5% by weight, based on the weight of unmodified polyethylene, of an ethylenically unsaturated polycarboxylic acid anhydride modifier, under melt conditions at a temperature within the range of from 140° C. to 210° C. in the presence of an organic peroxide having a half life of at least about 60 seconds within said temperature range whereby substantially all of said modifier is grafted onto the polyethylene backbone to produce a graft modified polyethylene, said graft modified polyethylene having a melt viscosity greater than the melt viscosity of said unmodified polyethylene.

2. A process in accordance with claim 1, where the modifier is an ethylenically unsaturated anhydride of the formula,

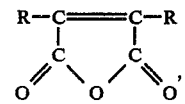

where R is a monovalent radical selected from the class consisting of hydrogen, halogen or a lower alkyl group.

3. A process in accordance with claim 1, where the organic peroxide is an aliphatic organic peroxide.

4. A process in accordance with claim 1, where the organic peroxide is dicumyl peroxide.

5. A process in accordance with claim 1, where the temperature employed is in the range of between 160° C.-180° C.

6. A process in accordance with claim 1, where there is employed on a weight basis from 0.05-0.5 parts of organic peroxide per 100 parts of polyethylene.

7. A graft modified polyethylene, of the claim 1 process having from about $5 \times 10^{-4}$ to about $1 \times 10^{-1}$ active

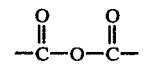

sites per 100 grams of polyethylene.

8. A graft modified low density polyethylene in accordance with claim 7.

9. A graft modified high density polyethylene in accordance with claim 7.

10. A process in accordance with claim 1, wherein said organic peroxide is of the formula:

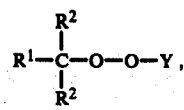

where Y is selected from hydrogen and

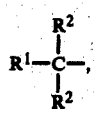

and where $R^1$ and $R^2$ are selected from monovalent hydrocarbon radicals.

11. A process in accordance with claim 2, wherein the modifier is maleic anhydride.

12. A process in accordance with claim 3, wherein the modifier is maleic anhydride.

13. A process in accordance with claim 4, wherein the modifier is maleic anhydride.

14. A process in accordance with claim 5, wherein the modifier is maleic anhydride.

15. A process in accordance with claim 6, wherein the modifier is maleic anhydride.

16. A process in accordance with claim 10, wherein the modifier is maleic anhydride.

* * * * *